May 26, 1964 — F. W. MANN — 3,134,346
CORN PLANTER
Filed Feb. 9, 1962 — 2 Sheets-Sheet 1
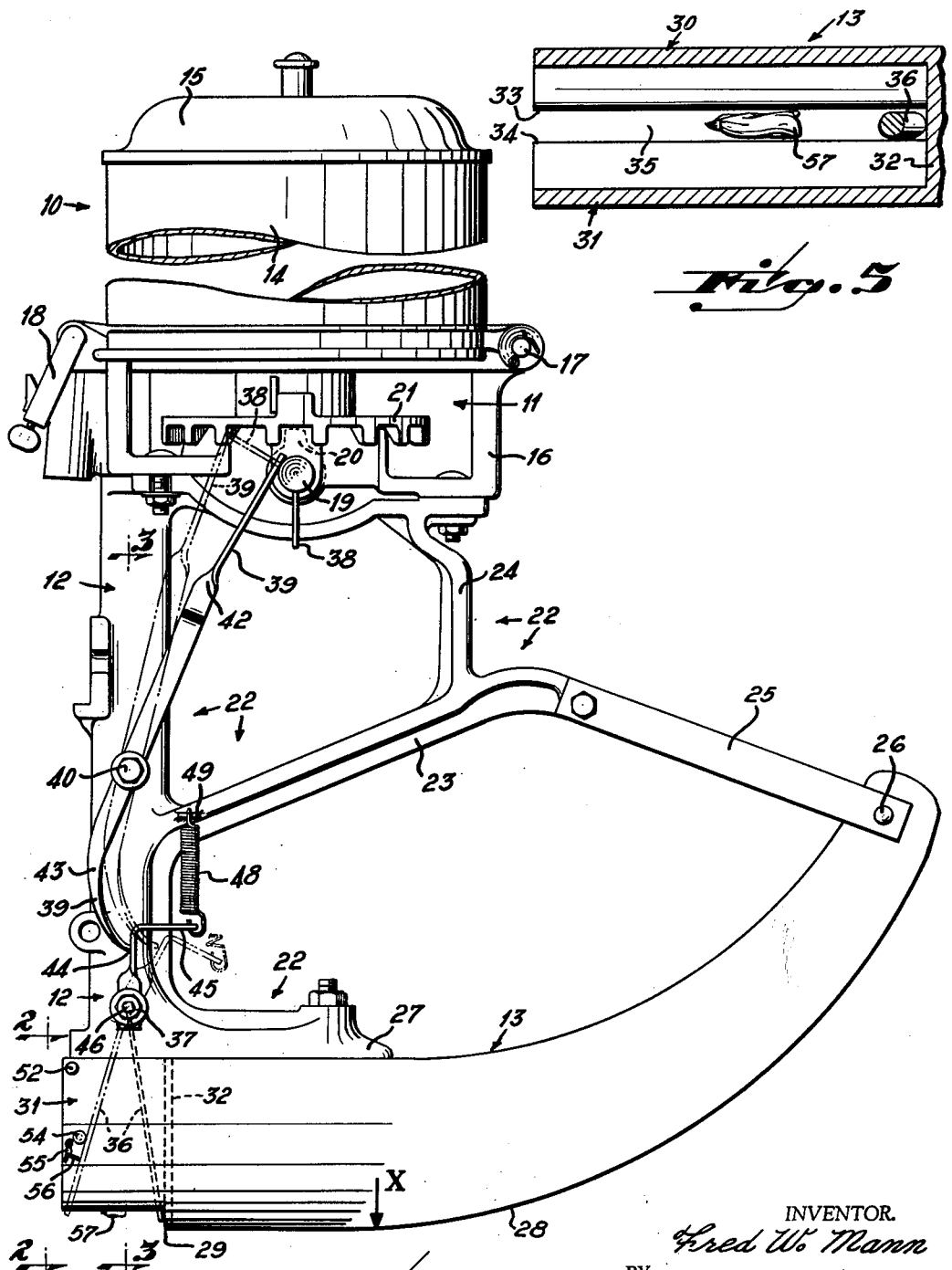
INVENTOR.
Fred W. Mann
BY Wood, Herron & Evans
ATTORNEYS

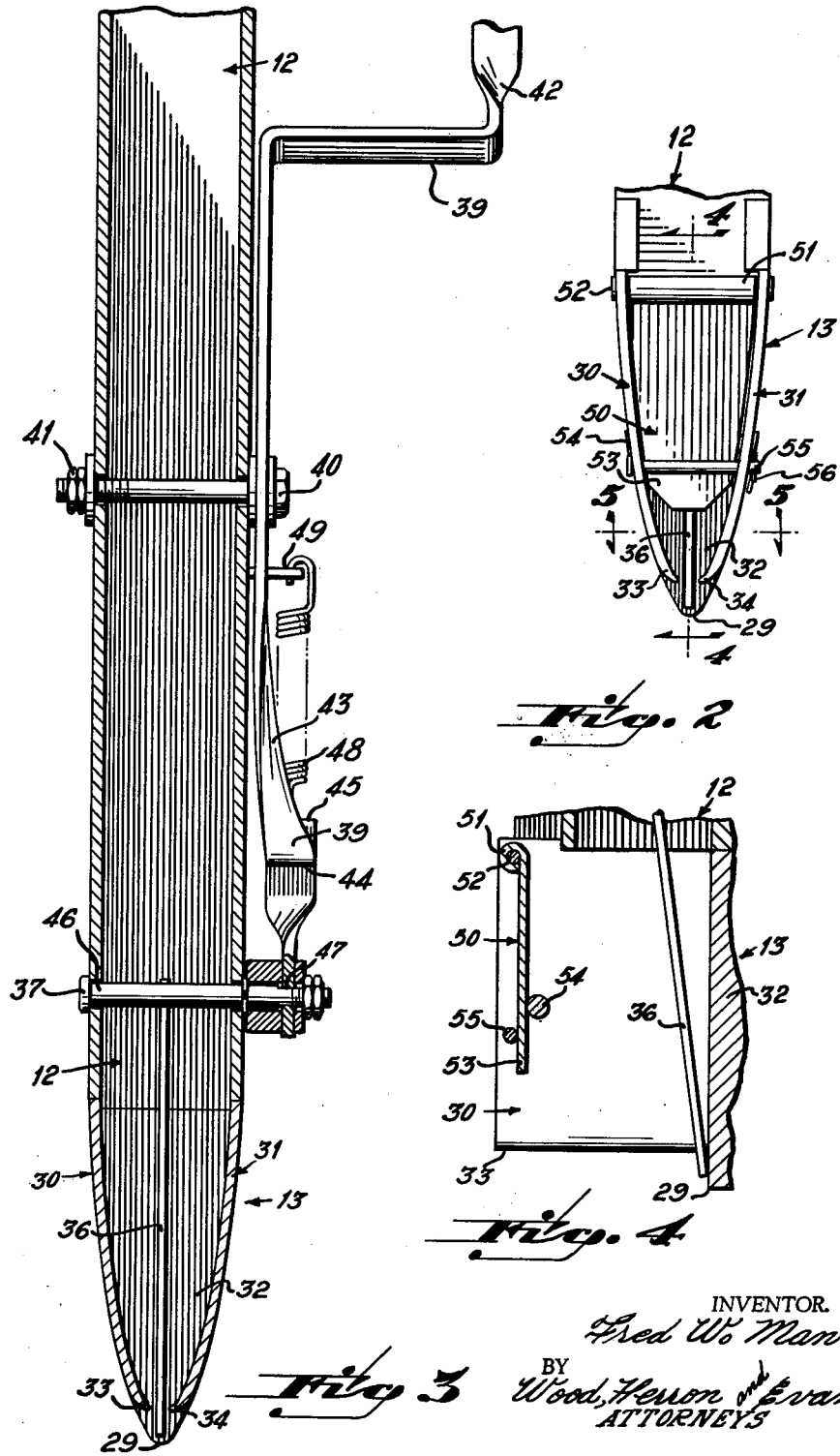

United States Patent Office 3,134,346
Patented May 26, 1964

3,134,346
CORN PLANTER
Fred W. Mann, 128 N. Norman, Evansville 11, Ind.
Filed Feb. 9, 1962, Ser. No. 172,128
5 Claims. (Cl. 111—86)

This invention relates to corn planters and it specifically concerns an improved corn planter which is adapted to orient kernels of seed corn as they are deposited in a furrow.

By way of explanation, a kernel of corn may be said to have a "point," which is the attached end while on the cob, and a "top," which is the exposed end while on the cob. Thus, a kernel of corn may be considered to have an axis, this being the imaginary line which passes through the center of the kernel from point to top. This axis is radial while the kernel is on the cob. The improved corn planter of this invention orients the kernel so that this axis parallels the furrow in which it is planted. Tests have shown substantial increases in yield when kernels of seed corn are oriented in this way. In the past, no consideration has been given to the orientation of the kernels at planting and they have been deposited at random, some crosswise, some parallel and, of course, many at odd angles to the furrow.

The increased yield is the result of several factors. It is found that initial germination of a kernel of corn results in the growth of a root which projects straight away from the point of the kernel. This primary root continues to grow straight out and by the time the corn is ready for the first cultivation it has reached out anywhere from 6 to 10 inches or more. If the kernel is oriented crosswise of the furrow, close cultivation cuts it off, which inhibits the growth of the young corn. On the other hand, when this root is not cut off, the corn is found to reach maturity earlier. By orienting a kernel so that its axis is parallel to the furrow, the cutting of this primary root is avoided.

It is also found that when a stalk of corn developes ears, they are at the sides of the axis of the seed kernel. Therefore, if the seed kernel is planted so that its longitudinal axis parallels the furrow, the ears are at the sides of the furrow. This has many advantages not only during growth but also at maturity when the corn is picked by automatic machinery.

It may be seen, therefore, that the primary objective of this invention is to provide a corn planter which orients kernels of seed corn in order to obtain increased yields.

A further objective of the invention has been to provide an improved corn planter for orienting kernels of corn which is simple in construction and unusually rugged so as to withstand the shocks and rough usage to which corn planters are subjected.

A further objective has been to provide a corn planter of the type set forth having means to prevent dirt from collecting in the opening through which the kernels exit so as to insure that each kernel that leaves the hopper of the planter is placed in the ground.

Other objectives and advantages of the invention will be readily apparent to those skilled in the art from the following detailed description of the drawings in which:

FIG. 1 is a side elevational view showing a typical corn planter to which the improvement of this invention has been added.

FIG. 2 is a fragmentary end elevational view taken on the line 2—2 of FIG. 1.

FIG. 3 is an enlarged fragmentary, cross sectional view taken on the line 3—3 of FIG. 1.

FIG. 4 is an enlarged fragmentary, cross sectional view taken on the line 4—4 of FIG. 2.

FIG. 5 is an enlarged fragmentary, cross sectional view taken on the line 5—5 of FIG. 2.

The basic corn planter which is disclosed in the drawings is that type which is adapted to be fastened to the rear of a tractor by means of a draw bar or bars. Planters of this type are for the most part used in pairs or in gangs of four rather than singly. Generally, the corn planter shown comprises a seed hopper 10, in which a supply of kernels of seed corn may be placed, a seed dispenser, shown generally at 11, which is designed to dispense one seed at a time from the hopper in timed relation to the forward movement of the tractor. Each seed is dropped into a hollow seed tube 12 and it falls down the tube to the rear of a runner, designated generally by the numeral 13. More particularly, the seed hopper consists of a can 14 having a lid 15. The can sits on top of the seed dispensing mechanism 11 which is mounted on an upper frame 16 and which is secured thereto by a mount pin 17 at the front and a spring latch 18 at the rear. The dispensing mechanism is driven by means of a cross shaft 19 which is connected in known manner to the drive of the tractor. Cross shaft 19 has a lug 20 extending radially from it and this lug is adapted to engage a cog wheel 21. The cog wheel 21 has a series of teeth depending from its outer periphery and these teeth are engaged by the lug 20 so that the cog wheel is indexed one tooth each time the cross shaft 19 rotates. This causes one seed to be dropped from the dispensing mechanism into the hollow seed tube 12 so that it falls down through the tube to the rear end of the runner or shoe 13 and from there into the furrow which is formed as the runner progresses along the ground.

The upper frame 16 is bolted to a lower frame designated generally 22 this latter frame including the hollow seed tube 12, a brace 23 which projects forwardly and upwardly from the lower part of the hollow seed tube, a bracket 24 which projects vertically from brace 23 and which extends up into engagement with upper frame 16. The lower frame also includes an extension of brace 23 to which is attached a tie bar 25. The tie bar extends forwardly and downwardly and it has its lower front end fastened as at 26 to the forward end of the runner. The lower frame, in addition, includes a foot 27 which is formed as an integral part of the seed tube 12, being located at its lower end and extending forwardly therefrom to serve as a mount for the runner or shoe. The keel, indicated by the numeral 28, of the runner usually is cut out in the rear portion thereof starting at approximately the place marked "X" in FIG. 1. The parts described above are conventional and as has been suggested, no consideration has been given to orienting the seeds. Upon leaving the dispenser they have rattled their way down the seed tube to fall into the furrow with their axis disposed at random.

In the improvement of this invention, the keel is extending back to a point indicated at 29 in FIG. 1 approximately 2 inches from the rear end of the runner. This extension constitutes one difference between the conventional runner and one adapted to this invention. As shown in FIG. 2, the two side walls 30 and 31 of the runner flare out from one another in the area beneath foot 27 so as to form the furrow in which the seeds are deposited. In this instance, a cross wall 32 is welded in place between walls 30 and 31 in order to seal off that portion of the shoe ahead of the point designated 29 in FIG. 1. The area to the rear of wall 32 is that area into which the seeds fall after passing down through the hollow seed tube 12. Within this area the two side walls 30 and 31 are configurated as shown in FIG. 2 so that they converge downwardly toward one another, terminating in lips designated 33, 34 which define between them a slot 35 extending longitudinally of the runner and centered with respect to the keel. As shown, this slot is from ⅜ to ½ icnh above the keel and, as stated previously, it is approximately 2 inches long. It is through this slot that the seeds are deposited in the furrow.

One of the things that has made possible the design of the kernel orientation mechanism of this invention is the practice of grading seed corn. While odd sizes do stray into graded seed, they are, for the most, consistently the same size. For example, one grade of seed will vary in length from ½ to ⅝ inch, in width from ¼ to 5/16 inch, and in thickness from 5/32 to 7/32 of an inch. Thus, in order to have a kernel of corn of this grade fall through the slot so that its longitudinal axis is parallel with the slot, the width of the slot from lip to lip must be considerably less than ½ of an inch. It has been found that a width of approximately 5/16 of an inch works very well for corn of the grade size used as an example here.

Referring now to FIG. 3 it may be seen that a grain of corn falling down through the hollow seed tube 12 strikes the converging side walls 30, 31 and is directed to the slot. It is preferred that the convergence of the walls be gradual as shown in FIG. 3 so that the kernel does not strike an abrupt angular surface and bounce from it across to the other wall and so on. In the instance shown, the kernels more or less slide along the last portion of the lower end of one wall or the other of walls 30, 31 to the slot 35.

Quite likely if nothing further were done to orient the kernels at the slot some of them would rest crosswise of the slot, or the few over-sized seeds found in any one grade of seed might block the slot and for this reason an agitator designated generally by the numeral 36 is provided. This agitator consists essentially of a length of stiff spring wire such as heavy piano wire which is arranged to swing about a pivot, designated 37 in FIG. 1, through an arc of approximately 25 degrees from a forward position in which it is at the forward end of the slot to a rearward position in which it is at the rear end of the slot. In this arc it is preferred that the end of the agitator wire project through and below the slot when it is at the rear end of the arc of movement, although it does not project below the keel. At the rear it just clears the two lips defining the slot. The agitator wire, in swinging along the slot insures that any kernel which rests crosswise of the slot is turned and permitted to fall through the slot in the correct direction of orientation. Toward this end it is preferred that the rearward swinging movement of the wire be a deliberate, comparatively slow movement and that the return movement be a rapid one. This is accomplished in the present instance through a linkage system which connects the agitator wire 36 to the cross shaft 19 so that the wire goes through the one cycle of movement each time that cross shaft 19 rotates. Since cross shaft 19 is in direct driving connection to the seed dispensing mechanism, it may be seen that the wire 36 makes one cycle for each seed that is dropped down the hollow seed tube 12.

The slow deliberate rearward movement of the agitator wire does several things in addition to insuring that the seed is discharged through the slot. In the event an oversize seed is encountered, that is one that will not pass through the slot, the slow deliberate movement of the wire toward the rear simply pushes this seed out the open back end of the runner where it is deposited in the ground. It may be that under this particular circumstance the seed is not properly oriented. However, this is the only type of seed which is not so oriented. Another very important function of the agitator wire is to keep the slot free of accumulations of dirt. The first rearward movement of the wire removes such accumulations, and thereafter the slot remains free of dirt during the forward run of the tractor.

The specific mechanism employed to move the agitator wire through its cycle comprises a lug 38 which projects radially from cross shaft 19. This lug is designed to strike the upper end of a pivoted lever 39 and to force the upper end of this lever toward the rear of the planter. The lever is mounted upon a pivot bolt 40, which passes through the hollow seed tube 12 and which is locked in place by means such as a pair of lock nuts 41. The upper end of pivoted lever 39 is twisted at 90 degrees as shown at 42 so as to present a flat face to lug 38. At the lower end the pivoted lever 39 is also twisted as shown at 43 to present a flat end 44 to the side of an L-shaped crank arm 45 which is pivoted for rocking movement. As shown, crank arm 45 is mounted on a cross pin 46 which extends through the lower end of the seed tube, being journalled in the walls thereof. The end of this pin which passes through the crank arm has flats 47 formed upon it. These flats are keyed to the crank arm by lock nuts or other fastening devices so that rocking movement of the crank arm is translated into rotative movement of the pin 46. The upper end of the heavy piano wire agitator 36 is securely fastened to pin 46. This may be done by welding, or by passing the wire through a hole in pin 46 or by other conventional means. In any event, rocking movement of the crank arm results in back and forth swinging motion of the agitator wire.

The outer end of the L-shaped crank arm 45 has a coil spring 48 attached to it and this coil spring is fastened to the side of brace 23 as shown at 49. Thus, contact between lug 38 and the upper end of pivoted lever 39 causes the lower end of the pivoted level 44 to press against the side of the L-shaped crank arm and in doing so to swing the agitator toward the rear end of the slot. This is the deliberate movement to which reference has been made above. On the other hand, the return of the agitator wire is a result of the action of coil spring 48 which snaps the L-shaped crank arm up into the position shown in full lines in FIG. 1. This occurs after lug 38 passes the end of the pivoted lever 39. In FIG. 1 the position of lug 38 just prior to its coming off of the upper end of pivoted lever 39 is shown in dot dash lines.

Referring now to FIGURE 4, it will be seen that the area behind the crosswall 32 constitutes a chamber into which the seeds fall from the seed tube 12. There are times in the operation of the conventional corn planter when this chamber becomes jammed with dirt. This may occur in the initial drop of the planter into the ground at the start of a furrow, and it may also occur in the event the tractor stops and in doing so backs up slightly. In order to prevent such jamming, a gate designated 50 is provided, this gate being hinged so that it may be swung open toward the rear. In normal operation the gate is in the position shown in FIGURE 4. In order to provide the swinging movement, the upper end of the gate is formed to provide a sleeve 51 through which a hinge pin 52 projects, this hinge pin being journaled at its opposite ends in the two side walls 30—31 at the rear of the runner. As shown in FIGURE 2 the sides of the gate conform generally to the gradually converging side walls. The lower edge designated 53 stops short of the slot 35 to provide approximately an inch of space between the lower edge of the gate and the slot. The gate is held closed against a stop pin 54 which extends between side walls 30—31. The holding member constitutes a latch pin 55 having its opposite ends journaled in side walls 30—31 adjacent to the lower end of the gate. The latch pin preferably is held in place by means such as a cotter pin. In the event of dirt being forced into the chamber at the rear end of the runner, as might happen in the event the tractor is backed up with the runner in the ground, the cotter pin 56 may be removed, the latch pin taken out and the gate 50 swung up in order to provide access to the chamber. It is anticipated that the opening of the gate will seldom be necessary, because of the effectiveness of the agitator wire 36 in preventing accumulations of dirt in the slot. Thus, the gate is for emergency purposes only.

Reference is now made to FIGURE 5 which shows a kernel 57 of seed corn passing through the slot 35. In this instance, the kernel is oriented with the point toward the rear. Obviously, the point could be facing toward the front as well. Also under certain circumstances it is conceivable that a seed corn could fall down the seed tube and pass straight through the slot with the point straight down or straight up or at some other angle. The important consideration is, however, that the axis of the corn is parallel with the furrow in the sense that it is parallel with a vertical plane through the furrow. In observing seeds as they exit from the slot it is found that the majority, by far, exit from the slot such that their axes are parallel to the furrow and horizontal. This is probably because the seeds seldom if ever are aligned exactly with the slot and in coming down the seed chute they bounce from side to side, even hitting some of the cross pins or bolts therein, so that they gravitate toward the bottom of the runner by sliding against one of the side walls and in this position they are projected to the slot as shown in FIGURE 5 with their axes parallel to the furrow and generally horizontal. In this position, they drop into the furrow which is directly beneath the slot and remain in the oriented position in order to achieve the advantages of increased yields which have been discussed. In those few instances, when a kernel drops straight to the slot, it is obvvious that passage through the slot is only possible when the axis of the kernel is in the plane of the furrow. This is important because it insures that no kernels are placed cross-wise of the furrow, which is to be avoided for the reasons previously stated.

In the above description it has been assumed that the cross shaft 19 carries only one radially disposed lug 20 thereon to operate the seed dispenser and only one lug 38 to operate the agitator 36. Obviously, by increasing the number of lugs 20, the agitator can be made to operate once for each two, three or more seeds that are dropped. The important consideration here is that the agitator be made to operate cyclically and frequently with the seed dispenser to insure clearance at the slot to avoid misses in the planted row of corn.

Having described my invention, I claim:

1. In a corn planter of the type having a seed hopper, means to dispense one seed at a time from the hopper, a vertical seed tube adapted to receive seeds from the dispenser, a runner including a keel to open a furrow, and means located at the rear of the runner to receive seeds from the seed tube and deposit said seeds in said furrow, the improvement comprising:
   side walls at the rear of the runner converging downwardly and terminating in lips defining between them a slot which is disposed longitudinally of the runner and which is open at the rear of the runner;
   said slot being narrower than the length of the kernels of a selected grade of seed corn, and being slightly wider than the width of the kernels of said selected grade of seed corn, whereby said kernels can pass through the slot for deposit in the furrow only when their longitudinal axes are parallel to a vertical plane extending longitudinally of the furrow;
   an agitator;
   means within said seed tube above said slot pivotally mounting said agitator for swinging movement in which the lower end thereof swings in an arc lengthwise of said slot;
   and drive means for the last named means including means operatively connected to said means to dispense one seed at a time.

2. In a corn planter of the type having a seed hopper, means to dispense one seed at a time from the hopper, a vertical seed tube adapted to receive seeds from the dispenser, a runner including a keel to open a furrow, and means located at the rear of the runner to receive seeds from the seed tube and deposit said seeds in said furrow, the improvement comprising:
   side walls at the rear of the runner converging downwardly and terminating in lips defining between them a slot which is disposed longitudinally of the runner and which is open at the rear of the runner;
   said slot being of a width to pass the kernels of a selected grade of seed corn only when said kernels are oriented such that their longitudinal axes are parallel with a vertical plane extending longitudinally of said slot;
   means associated with said seed tube and having a part thereof within said slot movable from a position adjacent to the forward end of the slot to a position adjacent to the rear end of the slot for clearing said slot of accumulations of dirt;
   and means interconnected with said means to dispense one seed at a time for driving said last named means in timed relation to said seed dispenser such that the last named means makes one cycle of movement lengthwise of the slot from and to the forward end thereof for a predetermined number of seeds that are dispensed from the hopper by said seed dispenser.

3. In a corn planter of the type having a seed hopper, means to dispense one seed at a time from the hopper, a cross shaft operating said means to dispense one seed at a time, a vertical seed tube adapted to receive seeds from the dispenser, a runner including a keel to open a furrow, and means located at the rear of the runner to receive seeds from the seed tube and deposit said seeds in said furrow, the improvement comprising:
   side walls at the rear of the runner converging downwardly and terminating in lips defining between them a slot which is disposed longitudinally of the runner and which is open at the rear of the runner;
   said slot being of a size to pass the kernels of a selected grade of seed corn only when their longitudinal axes are disposed parallel to a vertical plane extending longitudinally of said furrow;
   means associated with said seed tube and having a part thereof within said slot movable from a position at the front of said slot to the rear of said slot and then to the front of said slot;
   and means linking said last named means to said cross shaft, whereby said last named means operates cyclically with said cross shaft and the dispenser operated thereby.

4. In a corn planter of the type having a seed hopper, means to dispense one seed at a time from the hopper, a vertical seed tube adapted to receive seeds from the dispenser, a runner including a keel to open a furrow, and means located at the rear of the runner to receive seeds from the seed tube and deposit said seeds in said furrow, the improvement comprising:
   side walls at the rear of the runner generally converging toward one another downwardly to define between their lower edges a slot which is disposed longitudinally of the runner and which is open at the rear of the runner;
   a stiff wire;
   means mounting said wire in said seed tube above said slot for swinging movement in an arc which is in a plane common to the plane passing vertically through the longitudinal central axis of the slot with one end of the arc terminating at the rear end of the slot and the other end terminating below the forward end of the slot;
   and means to drive the wire through one cycle of said swinging movement starting and stopping below the forward end of the slot in timed relation to said means to dispense one seed at a time from the hopper.

5. The improvement as set forth in claim 4 in which the means to drive the wire through one cycle includes mechanical linkage to said seed dispenser to drive the wire rearwardly, and spring means independent of said linkage to drive the wire forwardly.

(References on following page)

References Cited in the file of this patent

UNITED STATES PATENTS

| | | |
|---|---|---|
| 740,091 | Cole | Sept. 29, 1903 |
| 1,074,749 | Schoening | Oct. 7, 1913 |
| 1,304,992 | Lanham | May 27, 1919 |
| 2,506,658 | White | May 9, 1950 |
| 2,554,205 | Oehler | May 22, 1951 |
| 2,636,459 | Graves | Apr. 28, 1953 |
| 2,872,883 | Podrick | Feb. 10, 1959 |
| 3,102,569 | Fosberg | Sept. 3, 1963 |

FOREIGN PATENTS

| | | |
|---|---|---|
| 403,676 | Germany | Oct. 6, 1924 |
| 305,770 | Great Britain | Feb. 14, 1929 |

OTHER REFERENCES

The Structure of Economic Plants by Herman E. Hayward, published in 1938 (pgs. 118 and 119 relied on).

Agricultural Research, vol. 7, No. 9, March 1959, pages 6 and 7 relied on.